United States Patent [19]

Olry et al.

[11] Patent Number: 5,203,059

[45] Date of Patent: Apr. 20, 1993

[54] METHOD OF MAKING A FIBER PREFORM OF VARYING THICKNESS

[75] Inventors: Pierre Olry, Bordeaux; Philippe Dupont, Le Bouscat, both of France

[73] Assignee: Societe Europeenne de Propulsion, Suresness, France

[21] Appl. No.: 801,541

[22] Filed: Dec. 2, 1991

[30] Foreign Application Priority Data

Dec. 3, 1990 [FR] France .................. 90 15125

[51] Int. Cl.$^5$ .................. D04H 1/46; D04H 3/10; B32B 5/06; B29C 67/14
[52] U.S. Cl. .................................... 28/107
[58] Field of Search ............... 28/107, 108, 109, 110, 28/112, 111, 113

[56] References Cited

U.S. PATENT DOCUMENTS

| 1,452,704 | 4/1923 | Poulin et al. | 28/110 X |
| 4,071,394 | 1/1978 | Ball | 28/110 X |
| 4,790,052 | 12/1988 | Olry | 28/110 |

FOREIGN PATENT DOCUMENTS

| 0232059 | 8/1987 | European Pat. Off. | |
| 0001397 | 2/1991 | European Pat. Off. | 28/107 |
| 0424988 | 5/1991 | European Pat. Off. | 28/107 |
| 2626294 | 7/1989 | France | |
| 3-014667 | 1/1991 | Japan | 28/107 |
| 2177345 | 1/1987 | United Kingdom | |

Primary Examiner—Clifford D. Crowder
Assistant Examiner—John J. Calvert
Attorney, Agent, or Firm—Weingarten, Schurgin, Gagnebin & Hayes

[57] ABSTRACT

In a portion of the preform to be made in which the preform is to be of reduced thickness by having a recess formed therein, a mask is interposed between pairs of adjacent layers, the mask being made of a thin film of material through which the needles can pass during needling while opposing the passage of significant quantities of fiber taken by the needles, and after it has been needled, each layer is cut out around a line corresponding to the outline of the recess in the preform at the level where the layer is situated in the preform. A mask situated between two cutout layers occupies an area that is not less than the area between the cutout lines of the two layers, such that the portions of the layers that are delimited by the cutout lines are not securely connected to the remainder of the preform by the needling, thereby enabling the recess to be formed after all the layers have been needled by withdrawing the cutout portions of the layers and by peeling off the masks.

7 Claims, 3 Drawing Sheets

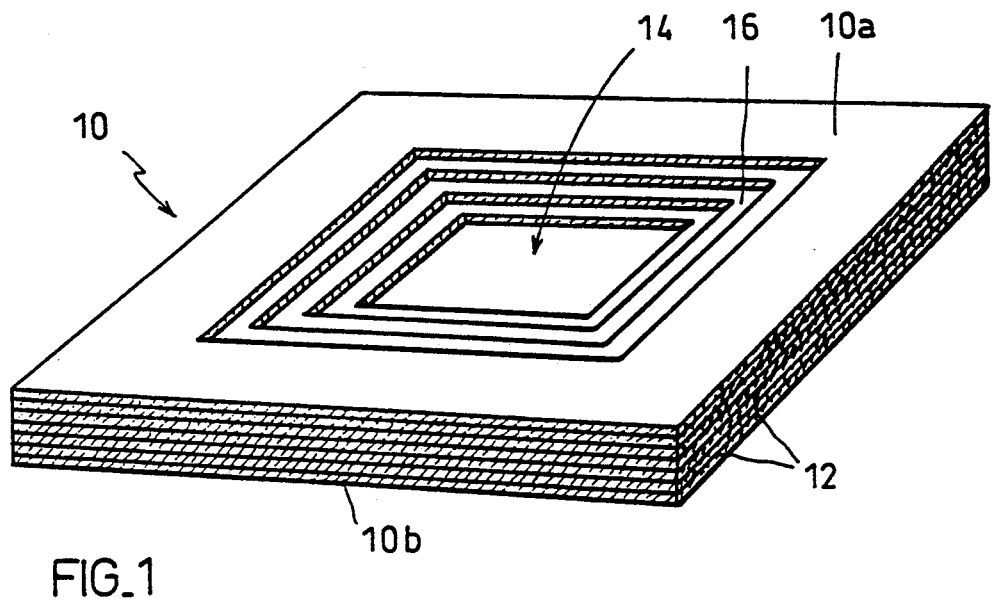
FIG_1
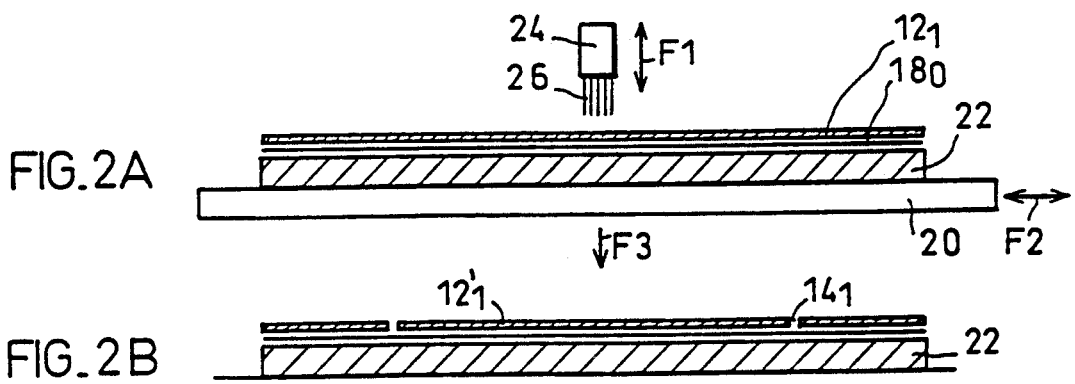
FIG.2A
FIG.2B
FIG.2C
FIG.2D

METHOD OF MAKING A FIBER PREFORM OF VARYING THICKNESS

The present invention relates to making reinforcing fiber preforms for manufacturing parts made of composite material.

The field of the invention is composite material parts comprising a fiber preform densified by a matrix, and more particularly, but not exclusively, parts in the form of sheets or webs that are thin relative to their other dimensions. One example of an application of the invention lies in making parts of structural composite materials, i.e. materials whose mechanical properties enable them to be used as structural components, in particular parts made of thermostructural composite materials, i.e. materials capable of conserving their mechanical properties at high temperatures. Examples of thermostructural composites are carbon-carbon (C/C) composites constituted by a reinforcing preform of carbon fibers densified by a matrix of carbon, and ceramic matrix composites (CMC) constituted by a reinforcing preform normally made of refractory fibers (carbon or ceramic, for example) and densified by a ceramic matrix.

BACKGROUND OF THE INVENTION

One known way of making fiber preforms for parts made of composite material consists in superposing layers of fiber fabric and in needling the layers together in order to bind them together in a direction that extends transversely to the layers. Such a method is described, for example, in Document FR-A-2 584 106, in which the layers are needled as and when they are superposed.

The layers are constituted by a fiber fabric that is generally two dimensional, e.g. a cloth or a felt. More complex fabrics may be used, e.g. sheets of cables extending in a single direction and pre-needled together or held together by a fiber web, or a cloth or a web of pre-needled fibers.

This prior technique encounters difficulties of implementation when the thickness of the preform to be made is not constant, with the shape of the preform corresponding to the shape of the part that is to be manufactured.

Under such circumstances, with a preform having a hollow portion of varying thickness, for example, cutouts may be formed in the layers in order to form the desired hollow by superposing the pre-cutout layers.

Unfortunately, because of the non-uniform thickness of the superposed cutout layers, needling is difficult and it becomes practically impossible to perform needling with constant effectiveness within the preform.

An object of the invention is thus to provide a method of making a fiber preform of varying thickness by needling together superposed layers, while enabling the desired shape to be obtained accurately.

SUMMARY OF THE INVENTION

According to the invention, this object is achieved by the fact that within the, or each, portion of the preform that is to be made in which the thickness of the preform is to be reduced so as to form a recess:

a mask is interposed between two adjacent layers, the mask being constituted by a thin film of a material suitable for allowing the needles to pass therethrough during needling while preventing significant quantities of fibers caught by the needles from passing therethrough; and each layer is cut out after it has been needled along a line corresponding to the outline of the recess in the preform at the level at which the layer is situated within the preform;

a mask situated between two cutout layers occupying an area that is not less than the area extending between the cutout lines of the two layers, such that the portions of the layers delimited by the cutout lines are not securely connected to the remainder of the preform by the needling and so that the recess can be formed, after all of the layers have been needled, by removing the cutout portions of the layers and by peeling off the masks.

A layer may be cut immediately after being needled, with the cutout portion thereof being left in place until all of the layers have been needled. As a result, each needling pass that takes place after a new layer has been put into place is performed on a stack of layers that is substantially uniform in thickness, thereby simplifying needling.

In a variant, the layers may be cut out after all of the layers have been needled together, with cutting out beginning at the first or the last layer and proceeding successively layer by layer as the cutout portions of the layers are removed.

The masks are constituted by thin films that do not give rise to significant excess thicknesses during needling. The thickness of a film is preferably no greater than 0.2 mm.

A film may be made of polyethylene, for example.

BRIEF DESCRIPTION OF THE DRAWINGS

Implementations of the invention is described by way of example with reference to the accompanying drawings, in which:

FIG. 1 is a diagrammatic perspective view of a fiber preform of varying thickness;

FIGS. 2A to 2L show the successive steps in making the preform of FIG. 1 by means of a method in accordance with the invention.

DETAILED DESCRIPTION

Figure 2E:
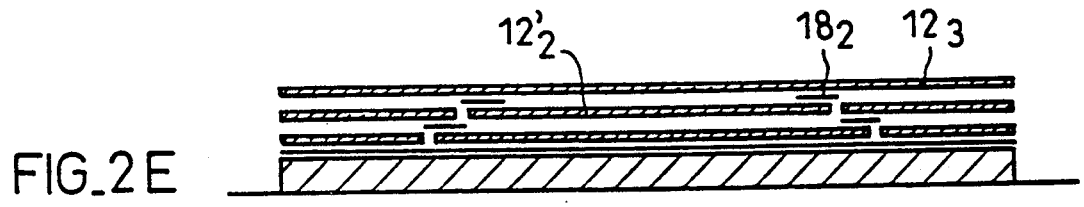

An example of implementing the method of the invention is described below for the case where a fiber preform is to be made that comprises a stack of layers laid flat.

Each layer is constituted by a two-dimensional fiber fabric. Several types of fabric may be used, in particular fabrics made from short fibers, from continuous or discontinuous threads, from yarns or cables, or else from slivers. Thus the layers may be constituted by layers of felt, layers of cloth, or layers made up of sheets of yarns or cables extending in a single direction only, with the directions of the yarns or cables changing from one layer to another. More complex fabrics may be used, for example such as a composite of pre-needled fabric and a fiber web, or a composite of pre-needled sheet of cables and a fiber web, or a composite of pre-needled plurality of sheets of yarns or cables. For complex fabrics, pre-needling is performed at a relatively low density per unit area (e.g. 5 to 20 stitches/cm$^2$) since the purpose of pre-needling is merely to enable the fabrics to be handled.

The material from which the fibers in the preform are made is selected as a function of the intended use to which the manufactured part is to be put after densification of the preform.

For parts made of thermostructural composite material, the preform is made of the fibers that are conventionally used for manufacturing such parts, such as aramide fibers, carbon fibers, or ceramic fibers (carbides, oxides, silicides, borides, etc., e.g. silicon carbide or silicon carbinitride).

With carbon fibers, and above all with ceramic fibers, the reinforcing fabric is made, particularly during the needling stage, by acting on a precursor for the fibers, as is known per se. The term "precursor" is to be understood as covering any intermediate stage in the making of fibers, regardless of whether the precursor is the organic precursor proper or whether it is at a later stage of heat treatment that enables the fabric character of the fiber to be optimized for good needling. Thus, by way of example, for a reinforcing fabric made of carbon fibers using polyacrylonitrile (PAN) as the precursor, needling is performed on fibers in the preoxidized PAN state, prior to carbonization, whereas for a reinforcing fabric made of silicon carbide fibers having polycarbosilane (PCS) as its precursor, needling is performed on precursor fibers in the unmeltable state, after moderate heat treatment to complete cross-linking, but before ceramization.

As shown in FIG. 1, the preform 10 that is to be made is constituted by a flat stack of square or rectangular layers 12, and in its central portion it has a recess or hollow 14 which is likewise rectangular or square in shape. The recess 14 extends from one of the faces $10a$ of the preform 10 through a fraction of the thickness thereof and it is generally concave in shape with its area decreasing going away from the face $10a$. The recess 14 is made by making cutouts in the layers 12 to give successive steps 16 along the edges of the recess 14. The "tread" size of the steps 14 naturally varies depending on the extent to which the size of the recess 14 varies with depth.

The preform is needled using the principle described in above-mentioned Document FR-A-2 584 106.

The needing is performed on a horizontal support 20 by means of a needle board 24 (shown only in FIG. 2A). The needle board 24 extends at least over the entire length of the preform and it is driven with reciprocating vertical motion (arrows F1). The support 20 is movable horizontally perpendicularly to the needle board (arrows F2), thereby presenting the needle board to the full width of the layers to be needled together. The platen 20 is also movable vertically (arrows F3).

After each new layer is put into place, a needling pass is performed over its entire area by displacing the support 20 horizontally. On each occasion that the needles 26 penetrate, the barbs or projections thereon entrain fibers of the layer-constituting material, which fibers provide transverse connections between the superposed layers. The needles penetrate into the preform over a depth equal to several times the thickness of a single layer. After a layer has been needled, the platen 20 is displaced vertically downwards through a step corresponding substantially to the thickness of one needled layer. As a result, the depth of needling is kept constant throughout the operation. After the last layer has been needled and in order to obtain a constant density of needling throughout the entire thickness of the preform, it is necessary to continue with finishing needling passes, as though new layers had been put into place.

The making of a preform by the method of the invention is now described in greater detail.

A first layer $12_1$ constituting the layer of the preform closest to the face $10a$ is placed on the support 20 after the following have been interposed successively on the platen 20 beneath the layer $12_1$ (FIG. 2A): a base 22; and an interface film $18_0$.

The base 22 is made of a material such as a plastic felt or foam, e.g. a polypropylene felt, in which the needles 26 can penetrate without being damaged and without pulling up particles or fibers into the preform. The film $18_0$ which may be glued to the base 22 is made of a material through which the needles 26 pass easily, but which prevents too many of the fibers in the layers themselves engaging in the base 22 which complicates subsequent separation of the completed preform and the base. For example, the film $18_0$ may be made of polyethylene.

The layer $12_1$ is needled to the base 22 which is itself thick enough to ensure that the needles 26 do not come into contact with the platen 20.

After the layer $12_1$ has been needled, it is cut out along a line $14_1$ which corresponds to the outline of the recess 14 at its opening (FIG. 2).

The layer $12_1$ is cut out through a thickness that is not less than that of the layer itself, and it may be performed manually, for example. For this purpose, a template can be used whose outline reproduces the line $14_1$, together with a cutting tool such as a rotary cutter.

The central portion $12'_1$ of the layer $12_1$ delimited by the line $14_1$ is left in place, and a cutout mask $18_1$ whose outside shape corresponds to the outside shape of the central portion is placed exactly thereon, prior to putting a second layer $12_2$ into place (FIG. 2C). The central portion of the mask $18_1$ is open so that it reproduces substantially the shape of the step that is to be formed by the layer $12_2$.

After the platen 20 has been moved one step downwards, the layer $12_2$ is needled over its entire area. The mask $18_1$ is made of a material which is selected to prevent too many fibers from the layer $12_2$ engaging in the central portion $12'_1$ of the layer $12_1$, i.e. to prevent significant connection between the central portion $12'_1$ and the layer $12_2$. The mask $18_1$ may be made, for example, of identical material to the film $18_0$. The thickness of the mask $18_1$ is limited to avoid giving rise to significant excess thickness, e.g. it may be no greater than about 0.2 mm.

After the layer $12_2$ has been needled, it is cut out along a line $14_2$ which corresponds to the outline of the recess 14 at the level of the second layer in the preform 10, starting from the face $10a$ (FIG. 2D). The open mask $18_1$ is contained between the lines $14_1$ and $14_2$.

The central portion $12'_2$ of the layer $12_2$ as outlined by the line $14_2$ is left in place, and an open mask $18_2$ whose outside dimensions correspond to the dimensions of said central portion $12'_2$ is positioned exactly thereon prior to putting a third layer $12_3$ into place (FIG. 2E).

Figure 2F:
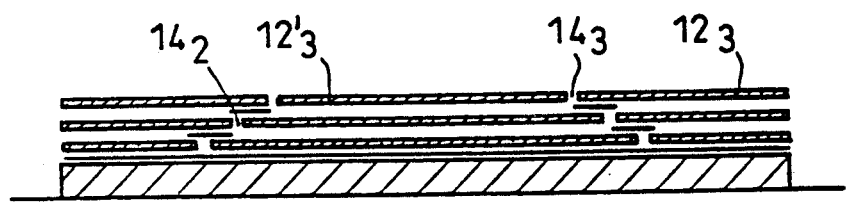

After the platen 20 has been moved one step downwards, the layer $12_3$ is needled over its entire area, and is then cut out along a line $14_3$ which corresponds to the outline of the recess at the level of the third layer from the face $10a$ of the preform (FIG. 2F). The open mask $18_2$ is contained between the lines $14_2$ and $14_3$.

Figure 2G:
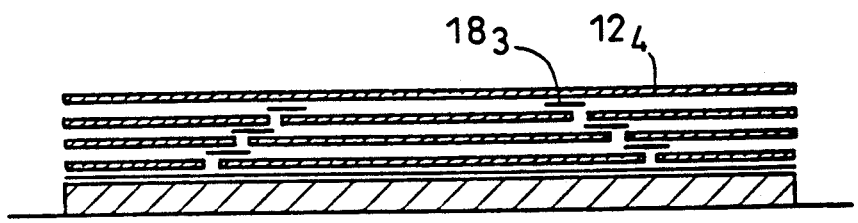

The central portion $12'_3$ of the layer $12_3$ as outlined by the line $14_3$ is left in place, and an open mask $18_3$ whose outside dimensions correspond to those of said central portion is put into place exactly thereon prior to putting a fourth layer $12_4$ into place (FIG. 2G).

Figure 2H:
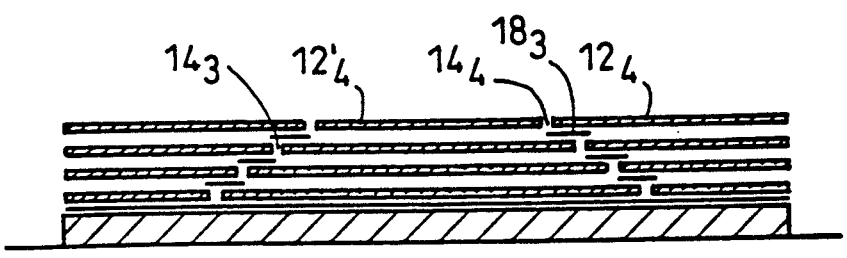

After the platen 20 has been moved one more step downwards, the layer $12_4$ is needled over its entire area and is then cut out on a line $14_4$ which corresponds to the outline of the recess 14 at the level of the fourth layer from the face 10a of the preform (FIG. 2H). The open mask $18_3$ lies between the lines $14_3$ and $14_4$.

Figure 2I:
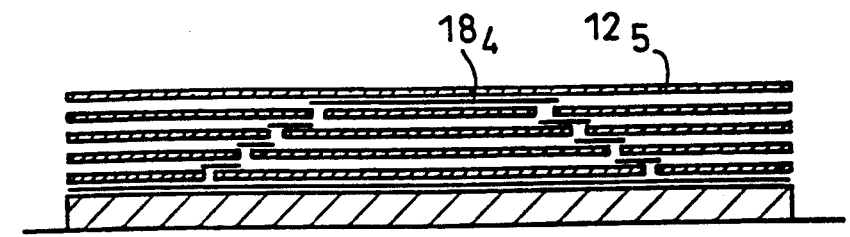

The central portion $12'_4$ of the layer $12_4$ outlined by the line $14_4$ is left in place, and a mask $18_4$ whose outside dimensions correspond to those of said central portion is put into place exactly thereon prior to putting a fifth layer $12_5$ into place (FIG. 2I).

After the platen 20 has been moved one more step downwards, the layer $12_5$ is needled over its entire area.

The masks $18_2$, $18_3$, and $18_4$ are made of the same material as the mask $18_1$.

In the example shown, the depth of the recess 14 corresponds to four layers.

Figure 2J:
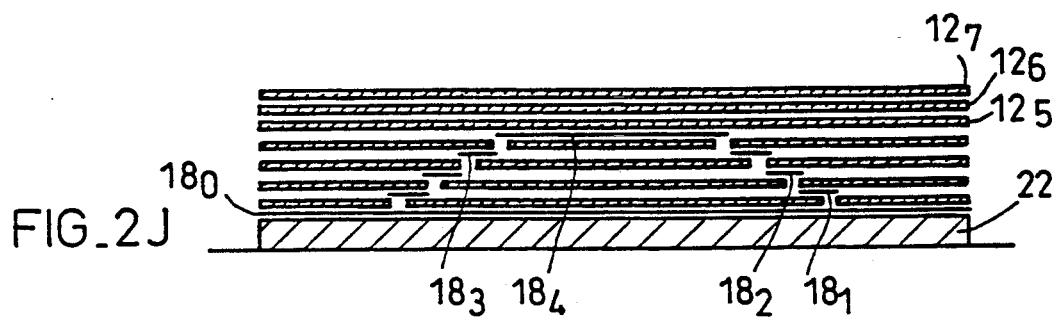

Thus, after the layer $12_5$ has been needled, the subsequent layers ($12_6$ and $12_7$) are put into place and needled in succession by moving the platen down one step each time, until the total thickness of the preform has been reached (FIG. 2J).

Figure 2K:
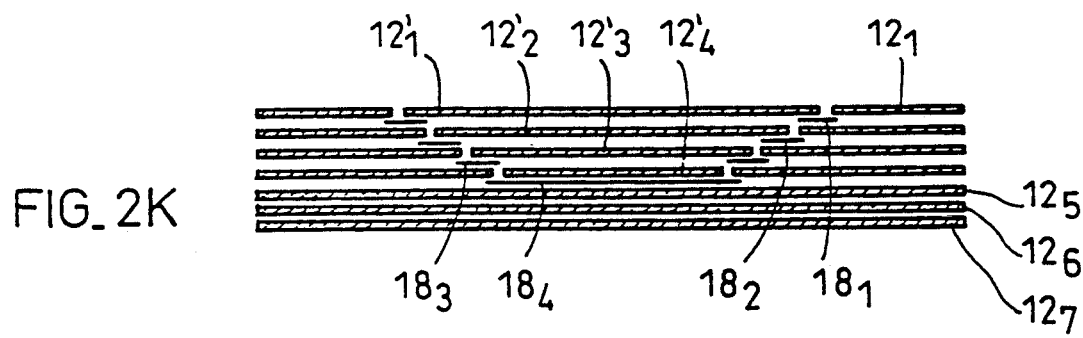

When needling has been completed, including the needling of the finishing passes, the resulting preform is separated from the base 22 and the film $18_0$, and it is turned over so that the layer $12_1$ is on top (FIG. 2K).

Figure 2L:
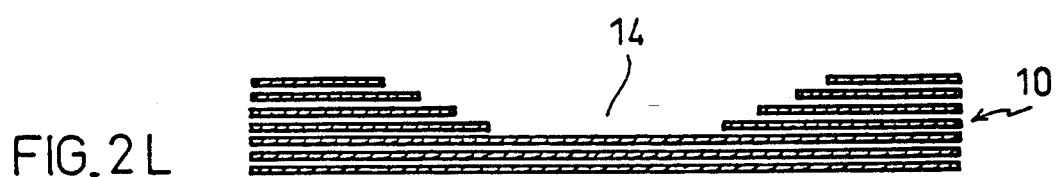

The central portions $12'_1$, $12'_2$, $12'_3$, and $12'_4$ of the layers $12_1$, $12_2$, $12_3$, and $12_4$ are connected only weakly to the remainder of the preform because of the masks $18_1$ to $18_4$, and they can therefore easily be removed. After the masks have been peeled off, the desired preform 10 is obtained complete with its recess 14 (FIG. 2L).

The masks $18_1$ to $18_4$ which are made of thin film and which are open enable substantially uniform thickness to be maintained during needling, thereby ensuring that needling takes place under the best possible conditions.

It would nevertheless be possible to use masks that are not open, providing the thickness of the masks and the number of masks are small enough.

In FIGS. 2A to 2L, the widths of the gaps between the layers are exaggerated to clarify the drawing. Similarly, the outline of the stepped recess corresponding to the layers is also exaggerated. Depending on the thickness of the layers, on the number of layers into which the recess 14 penetrates, and on the way in which the size of the recess varies as a function of depth, this stepped outline may be marked to a greater or lesser extent, and may hardly exist at all.

After the preform 10 has been made, it is densified to obtain the desired part made of composite material. Densification is performed by any technique known per se, such as chemical vapor infiltration (gas densification), for example, or impregnating with a matrix precursor and then applying treatment to obtain the matrix from the precursor (liquid densification).

In the example described, the preform 10 has only one recess 14. Naturally the masking method of the invention can be used in the same manner when a plurality of recesses are to be formed. In addition, the shape of the recess 14 may be other than square or rectangular, and the outline of the recess may follow any closed loop which may be curved to a greater or a lesser extent.

Furthermore, the layers may be cut out along the lines corresponding to the outline of the recess to be formed after all of the needling has been completed, instead of being performed after the needling of each layer. Cutting out then takes place at the stage corresponding to FIG. 2A. The layers are cut out successively after the cutout portion of the preceding layer has been removed and the preceding mask has been peeled off.

Figure 3:
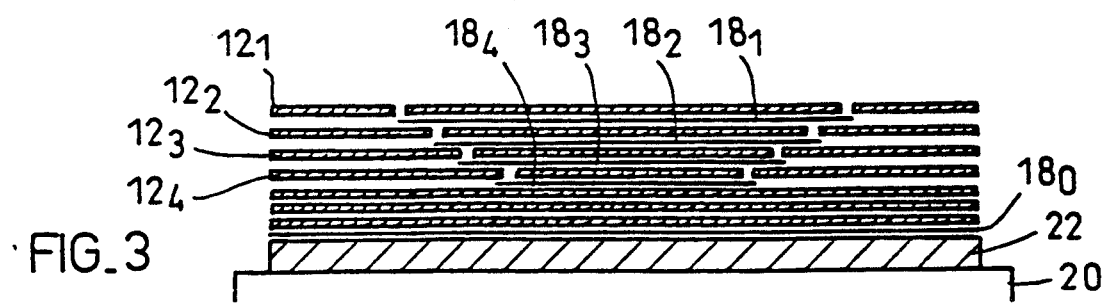
FIG. 3 shows a variant of the method shown in FIGS. 2A to 2L.

In yet another variant implementation of the method shown in FIGS. 2A to 2L, the putting into place and the needling of the layers on the support 20 provided with the base 22 and the film $18_0$ may be begun from the layers adjacent to the face 10b of the preform opposite to its face 10a (FIG. 1) and as shown in FIG. 3. A plurality of layers are thus superposed and needled prior to installing the mask $18_4$ at the bottom of the recess 14. Thereafter, the layers $12_4$, $12_3$, $12_2$, and $12_1$ are successively put into place, needled, and cut out, with the masks $18_3$, $18_2$, and $18_1$ being interposed. As before, the preform is obtained after removing the base 22 and the film $18_1$, and after removing the cutout portions of the layers $12_1$ to $12_4$ and peeling off the masks $18_1$ to $18_4$.

In the example shown in FIG. 3, the masks $18_1$ to $18_3$ are not open. However it would be possible to use open masks, as in the preceding example.

Finally, it may be observed that the masking technique of the invention can be used to make preforms formed by rolling a strip-shaped two-dimensional fiber fabric onto itself and then needling, instead of by stacking up flat layers. In this case, the needling technique may be as described in Document FR-A-2 584 107. Masks are interposed between the layers formed by the turns of the rolled-up preform, and cutouts are formed in these turns at locations that correspond to the location of the, or each, recess that is to be formed.

We claim:

1. A method of making a fiber preform of varying thickness to manufacture a part made of composite material, the method comprising superposing layers of fiber fabric and needling the layers together as they are superposed, and within the, or each, portion of the preform to be made in which the thickness of the preform is to be reduced so as to form a recess the steps of:

interposing a mask between two adjacent layers, forming the mask from a thin film of a material suitable for allowing the needles to pass therethrough during needling while preventing significant quantities of fibers caught by the needles from passing therethrough; and cutting out each layer after needling along a line corresponding to the outline of the recess in the preform at the level at which the layer is situated within the preform;

situating the mask between two cutout layers occupying an area that is not less than the area extending between the cutout lines of the two layers, such that the portions of the layers delimited by the cutout lines are not securely connected to the remainder of the preform by the needling and so that the recess can be formed, after all of the layers have been needled, by removing the cutout portions of the layers and by peeling off the masks.

2. A method according to claim 1, wherein each layer is cut out immediately after it has been needled, with the cutout portion thereof being left in place until all of the layers have been needled.

3. A method according to claim 1, wherein the layers are cut out after all of the layers have been needled, beginning with the first or last layer and proceeding successively by withdrawing the cutout portions of the layers one by one.

4. A method according to claim 1, wherein the masks are made of a polyethylene film.

5. A method according to claim 1, wherein the thickness of each mask is not greater than approximately 0.2 mm.

6. A method according to claim 1, wherein the first layer is disposed on a support with a base being interposed between the layer and the support, the base being made of a material enabling the needles to penetrate therein without being damaged.

7. A method according to claim 6, wherein a mask is interposed between the base and the first layer.

* * * * *